United States Patent [19]
Nishiwaki

[11] Patent Number: 5,991,671
[45] Date of Patent: Nov. 23, 1999

[54] AUTOMATIC TRAVELING CONTROL SYSTEM FOR VEHICLE

[75] Inventor: Takeshi Nishiwaki, Tokyo, Japan

[73] Assignee: Mitsubishi Denki Kabushiki Kaisha, Tokyo, Japan

[21] Appl. No.: 08/984,506

[22] Filed: Dec. 3, 1997

[30] Foreign Application Priority Data

Oct. 2, 1997 [JP] Japan .................................. 9-269592

[51] Int. Cl.⁶ ...................................................... B62D 6/00
[52] U.S. Cl. .............................. 701/23; 701/41; 180/410; 180/446
[58] Field of Search .................................. 701/23, 28, 41, 701/42, 25, 70; 180/410, 415, 421, 422, 423, 446; 318/587

[56] References Cited

U.S. PATENT DOCUMENTS

| | | | |
|---|---|---|---|
| 5,136,507 | 8/1992 | Shiraishi et al. | 701/41 |
| 5,189,613 | 2/1993 | Karnopp | 701/41 |
| 5,206,808 | 4/1993 | Inoue et al. | 701/70 |
| 5,373,911 | 12/1994 | Yasui | 701/23 |
| 5,379,222 | 1/1995 | Anan et al. | 701/41 |
| 5,521,820 | 5/1996 | Wakamatsu et al. | 701/42 |
| 5,661,650 | 8/1997 | Sekine et al. | 701/41 |

FOREIGN PATENT DOCUMENTS 7-81609  3/1995  Japan .

*Primary Examiner*—Gary Chin
*Attorney, Agent, or Firm*—Sughrue, Mion, Zinn, Macpeak & Seas, PLLC

[57] ABSTRACT

Disclosed is an automatic traveling control system for a vehicle which can provide satisfactory steering control during automatic traveling regardless of vehicle speeds. Wheel speeds of rear left and right wheels detected by first and second wheel speed sensors, and image data detected by a camera and including a guide way are input to a controller. The controller controls an amount of steering of a steering system by a drive motor to perform steering control through one of first and second control means which are switched over depending on a vehicle speed, thereby realizing autonomous traveling in which a predetermined positional relationship is held between the guide way and the vehicle.

9 Claims, 4 Drawing Sheets

AUTOMATIC TRAVELING CONTROL SYSTEM FOR VEHICLE

BACKGROUND OF THE INVENTION

1. Field of the Invention

The present invention relates to an automatic traveling control system for a vehicle which enables the vehicle to travel while making a turn at a target amount through control of a steering angle.

2. Description of the Related Art

One example of conventional automatic traveling control systems (automatic steering systems) for vehicles is disclosed in, e.g., Japanese Unexamined Patent Publication No. 7-81609. The conventional system described in the Japanese Unexamined Patent Publication No. 7-81609 comprises a wheel speed difference calculating means for calculating a difference in wheel speed between left and right wheels of at least one pair of front and rear wheels of a vehicle, which difference is required to achieve a target amount of turn, and a wheel speed control means for controlling the left and right wheels independently of each other to adjust the difference in wheel speed between the left and right wheels based on the calculated difference in wheel speed, so that the vehicle travels while making a turn at a target amount.

When the vehicle is stopped or when the vehicle speed is low, however, it is difficult to detect the difference in wheel speed, and sufficient control of turning or curving of the vehicle cannot be achieved. Thus, the above-mentioned conventional system has difficulty in achieving a predetermined amount of turn of the vehicle with high accuracy in those situations.

SUMMARY OF THE INVENTION

With a view of solving the problem as set forth above, an object of the present invention is to provide an automatic traveling control system for a vehicle which can accurately control a predetermined amount of turn while the vehicle is traveling at not only a high speed, but also a low speed.

An automatic traveling control system for a vehicle according to one aspect of the present invention comprises first control means for determining a target amount of turn of the vehicle and calculating a first target steering angle corresponding to the target amount of turn of the vehicle, second control means for determining an actual amount of turn of the vehicle and determining a second target steering angle at which a difference between the actual amount of turn and the target amount of turn of the vehicle is zero, steering angle control means for controlling a steering angle of the vehicle in accordance with an output of one of the first control means and the second control means, speed detecting means for detecting a speed of the vehicle, and switching means for selectively switching over the outputs of the first control means and the second control means depending on the vehicle speed detected by the speed detecting means, and supplying the selected output to the steering angle control means, thereby controlling the steering angle.

An automatic traveling control system for a vehicle according to another aspect of the present invention comprises first control means for determining a target amount of turn of the vehicle and calculating a first target steering angle corresponding to the target amount of turn of the vehicle, second control means for determining an actual amount of turn of the vehicle and determining a second target steering angle at which a difference between the actual amount of turn and the target amount of turn of the vehicle is zero, steering angle control means connected to the first and second control means for controlling a steering angle of the vehicle in accordance with outputs of the first control means and the second control means, speed detecting means for detecting a speed of the vehicle, and weighting means for applying weights to the outputs of the first control means and the second control means depending on the vehicle speed detected by the speed detecting means, and supplying the weighted outputs to the steering angle control means, thereby controlling the steering angle.

In a preferable form of the present invention, an automatic traveling control system for a vehicle further comprises position detecting means for detecting a curvature of a traveling load of the vehicle, wherein the first control means includes target amount-of-turn calculating means for calculating a target amount of turn from the curvature of the traveling road detected by the position detecting means, and target steering angle calculating means for calculating a target steering angle corresponding to the target amount of turn.

In another preferable form of the present invention, the second control means includes actual amount-of-turn calculating means for determining an actual amount of turn of the vehicle from an output of the speed detecting means, steering angle compensation value calculating means for calculating a steering angle compensation value based on the actual amount of turn determined by the actual amount-of-turn calculating means and the target amount of turn determined by the target amount-of-turn calculating means, and target steering angle calculating means for calculating a target steering angle in consideration of the steering angle compensation value calculated by the steering angle compensation value calculating means.

In still another preferable form of the present invention, the speed detecting means includes a first wheel speed sensor for detecting, as a first wheel speed, a speed of one wheel on one side of the vehicle, and a second wheel speed sensor for detecting, as a second wheel speed, a speed of one wheel on the other side of the vehicle, and the actual amount-of-turn calculating means calculates the actual amount of turn of the vehicle from the first and second wheel speeds detected by the first and second wheel speed sensors.

In still another preferable form of the present invention, the switching means has a hysteresis in determination for switching over the first and second control means.

In still another preferable form of the present invention, the weighing means changes the weights applied to the outputs of the first and second control means, which are supplied to the steering angle control means, in accordance with the vehicle speed.

DESCRIPTION OF THE PREFERRED EMBODIMENTS

Preferred embodiments of the present invention will be described hereunder in detail with reference to the accompanying drawings.

Embodiment 1

Figure 1:
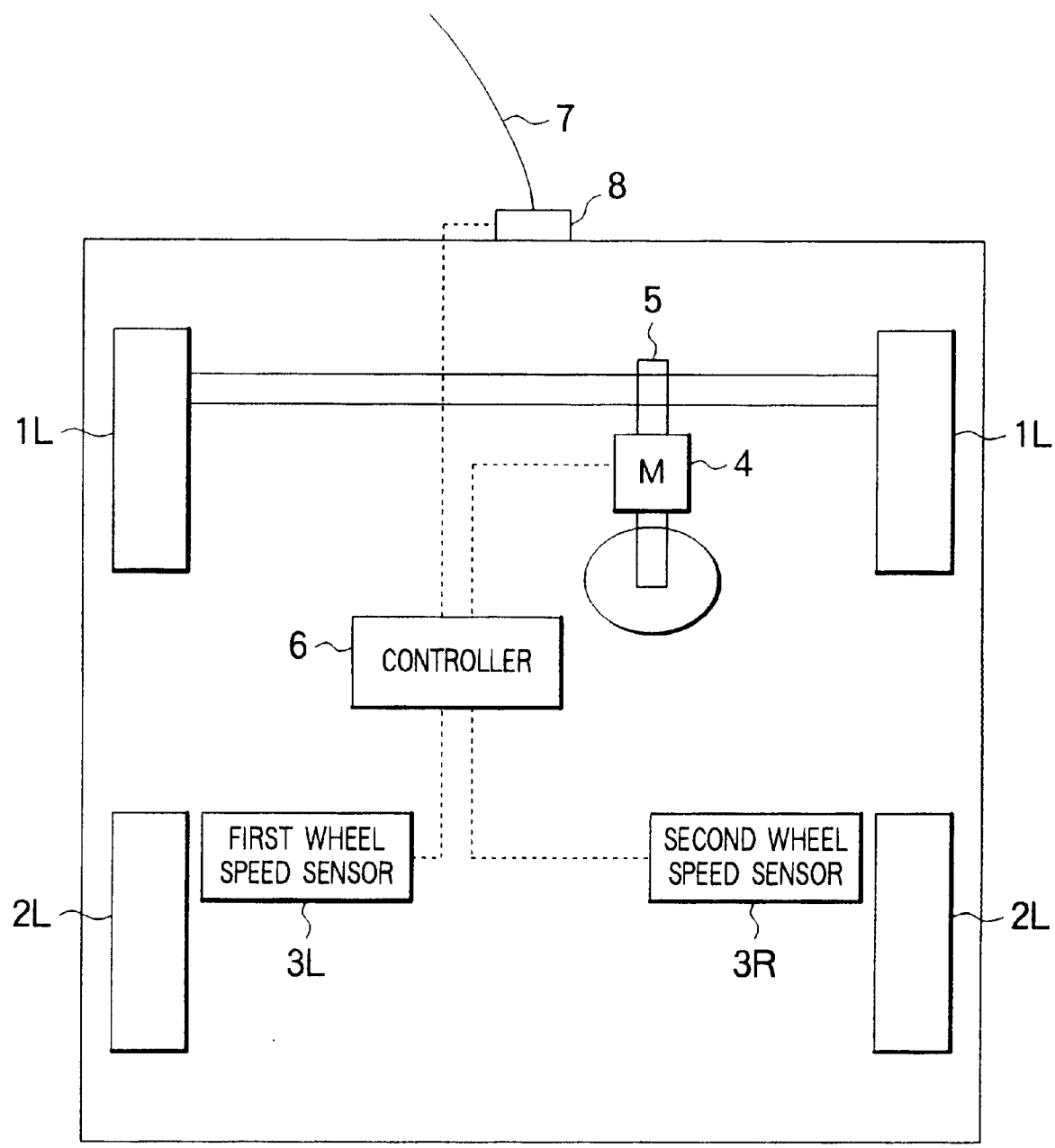
FIG. 1 is a system diagram showing the configuration of an automatic traveling control system for a vehicle according to the present-invention.

FIG. 1 shows the system configuration of an automatic traveling control system for a vehicle according to a first embodiment (abbreviated as Embodiment 1 hereinafter) of the present invention. In this Embodiment 1, the vehicle is supposed to run under a mode of automatic steering traveling (autonomous traveling) at a constant speed along a guide way provided on a traveling lane of roads.

In FIG. 1, denoted by reference symbols 1L, 1R, 2L, 2R are respectively a front left wheel, a front right wheel, a rear left wheel and a rear right wheel of the vehicle, and 3L, 3R respectively designate a first and a second wheel speed sensor for detecting rotational speeds of the rear left wheel and the rear right wheel, respectively. A reference numeral 5 designates a steering system constructed of a rack/pinion mechanism, and 4 is a drive motor mounted on a steering shaft of the steering system 5 for driving the steering shaft for rotation. The drive motor 4 includes a position detecting function of detecting a rotational position of the steering shaft.

The steering system 5 controls a steering angle of the vehicle, as shown in FIG. 1, with the aid of a controller 6 which controls a driving force of the drive motor 4 in accordance with the rotational position of the steering shaft detected by the drive motor 4.

To realize autonomous traveling of the vehicle following a guide way 7 provided on the road, the steering system 5, the drive motor 4, etc. are controlled by the controller 6. Input to the controller 6 are wheel speed signals VFL, VFR detected by the wheel speed sensors 3L, 3R and representing the wheel speeds of the rear left and right wheels, an image signal Dg detected by a position detecting means in the form of a camera 8, which is attached to a front end of the vehicle body, and representing an image of objects including the guide way 7, etc.

Using the wheel speed signals VFL, VFR read out of the wheel speed sensors 3L, 3R, the controller 6 calculates a vehicle speed (body speed) V based on the formula below;

$$V=(VFL+VFR)/2 \qquad (1)$$

and then compares the calculated vehicle speed V with a threshold (predetermined speed value) below which a predetermined amount of turn can be achieved more accurately by controlling the steering system 5, i.e., the drive motor 4, to have a steering angle determined from a target amount of turn than in the case of controlling the steering angle of the steering system 5 (i.e., the amount of rotation of the drive motor 4) so that a detected actual amount of turn agrees with the target amount of turn. Thereafter, the controller 6 controls a steering angle control means 203, as shown in the functional block diagram of FIG. 2, by selecting a first control means 200 through a switching means 204 if the vehicle speed V is smaller than the threshold, or selecting a second control means 300 if otherwise.

Figure 2:
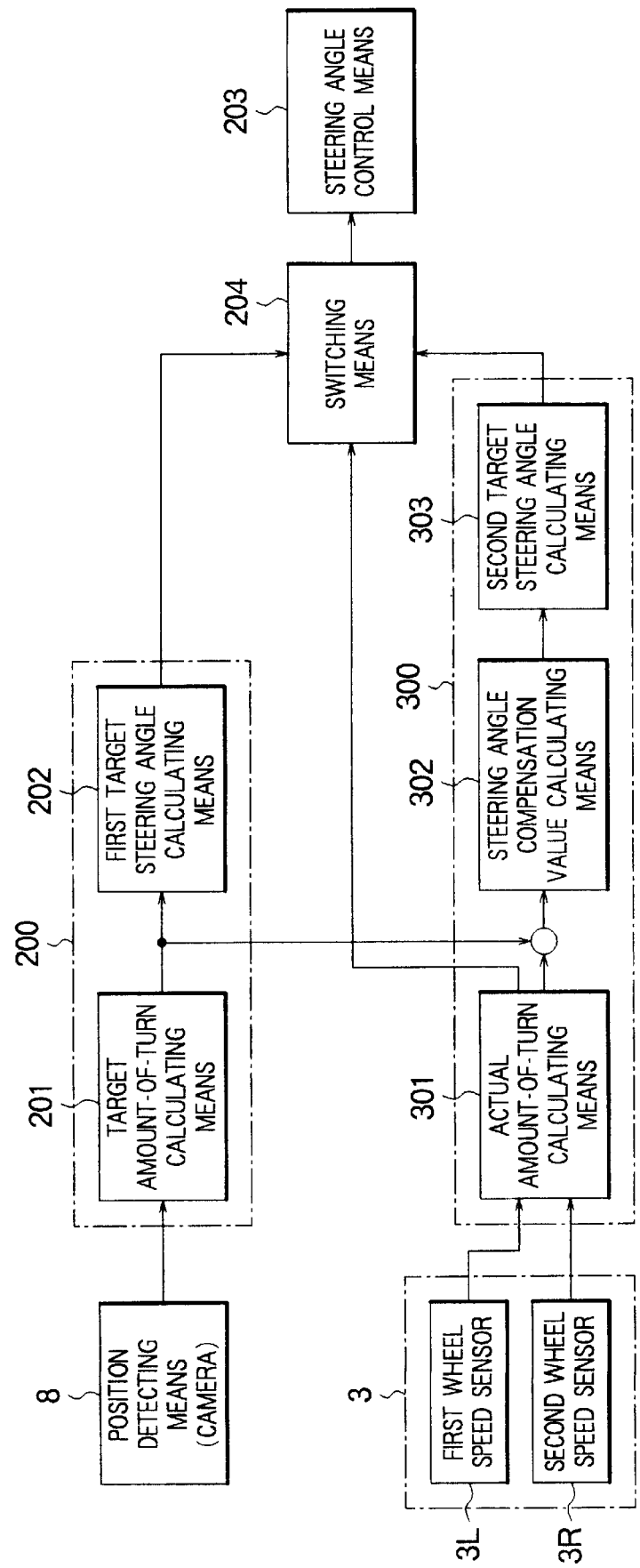
FIG. 2 is a functional block diagram showing functions of a controller in Embodiment 1 of the present invention.

In practice, the controller 6 is configured in this Embodiment 1 to carry out functions shown in the functional block diagram of FIG. 2. More specifically, the controller 6 comprises, as shown in FIG. 2, the first control means 200 for determining a target amount of turn of the vehicle and calculating a first target steering angle corresponding to the target amount of turn of the vehicle, the second control means 300 for determining an actual amount of turn of the vehicle and determining a second target steering angle at which a difference between the actual amount of turn and the target amount of turn is zero, the switching means 204 for selectively switching over the first control means 200 and the second control means 300 depending on the vehicle speed, and the steering angle control means for controlling the steering system 5 of the vehicle, i.e., the drive motor 4, in accordance with an output of the first control means 200 or the second control means 300.

The first control means 200 includes a target amount-of-turn calculating means 201 for calculating a target amount of turn from the curvature of the traveling road (i.e., the curvature of the guide way 7) detected by the camera 8, and a first target steering angle calculating means 202 for calculating a target steering angle corresponding to the target amount of turn.

The second control means 300 includes an actual amount-of-turn calculating means 301 for determining an actual amount of turn of the vehicle from an output of speed detecting means 3, a steering angle compensation value calculating means 302 for calculating a steering angle compensation value based on the actual amount of turn determined by the actual amount-of-turn calculating means 301 and the target amount of turn determined by the target amount-of-turn calculating means 201, and a second target steering angle calculating means 303 for calculating a target steering angle in consideration of the steering angle compensation value calculated by the steering angle compensation value calculating means 302.

The speed detecting means 3 is made up of the first wheel speed sensor 3L for detecting, as a first wheel speed, a speed of the wheel on one side of the vehicle, and the second wheel speed sensor 3R for detecting, as a second wheel speed, a speed of the wheel on the other side of the vehicle. The actual amount-of-turn calculating means 301 calculates the actual amount of turn of the vehicle from the first and second wheel speeds detected by the first and second wheel speed sensors 3L, 3R.

In FIG. 2, the target amount-of-turn calculating means 201 of the first control means 200 receives the image signal Dg picked up by the camera 8 and indicative of an area including the guide way 7, and calculates a curvature of the guide way 7, as a target amount (curvature) Kt of turn, through image processing of image data obtained in the previous shot.

The first target steering angle calculating means 202 calculates a target steering angle $\delta_{t1}$ at which the target amount (curvature) Kt of turn is achieved. It is generally known that the following relationship exists between the target steering angle calculated by the first target steering angle calculating means 202 and the target amount (curvature) of turn;

$$R=(1/k)=(1+AV^2)\times(1/\delta) \qquad (2)$$

where R: radius of turn (m), k: curvature (1/m), A: stability factor, V: vehicle speed (m/sec), l: wheelbase (m), and δ: steering angle (rad).

In the above formula, the stability factor A is a specific value uniquely determined depending on the conditions of the vehicle and the road surface, and it usually takes a value of 0.0002–0.0003.

When the vehicle speed is sufficiently small, the term $(1+AV^2)$ in the above formula (2) takes a value almost close to 1, and therefore the target steering angle $\delta_{t1}$ is calculated by the following formula (3):

$$\delta_{t1}=l\cdot k \qquad (3)$$

In the second control means 300 shown in FIG. 2, the actual amount-of-turn calculating means 301 calculates an actual curvature of turn of the vehicle from the left and right wheel speed signals VFL, VFR detected by the wheel speed sensors 3L, 3R by using the above formula (2), and applies the calculated result to the steering angle compensation value calculating means 302.

At the same time, the curvature of the guide way 7, i.e., the target curvature, which is obtained through image processing of the image signal Dg taken in from the camera 8 and indicative of the area including the guide way 7 is also supplied from the target amount-of-turn calculating means 201 of the first control means 200 to the steering angle compensation value calculating means 302 of the second control means 300.

Based on the actual curvature calculated by the actual amount-of-turn calculating means 301 and the target curvature calculated by the target amount-of-turn calculating means 201, the steering angle compensation value calculating means 302 then calculates, a steering angle compensation value by using the following formula;

$$\delta\Delta_t = K_b \cdot l \cdot (K_t - K_r) \quad (4)$$

(where $K_b$: feedback gain and l: wheelbase (m)).

Based on the steering angle compensation value calculated by the steering angle compensation value calculating means 302, the second target steering angle calculating means 303 determines a target steering angle $\delta_{t2}$ by using the following formula (5);

$$\delta_n = \delta_{n-1} + \delta\Delta_t \quad (5)$$

(where suffix n: current target value and suffix n−1: previous target value).

Thereafter, the switching means 204 receives the vehicle speed determined by the actual amount-of-turn calculating means 301 based on the outputs of the first and second wheel speed sensors 3L, 3R, switches over the output from the first target steering angle calculating means 202 and the output from the second target steering angle calculating means 303 depending on the vehicle speed, and applies the selected output to the steering angle control means 203. Specifically, the switching means 204 applies the output from the first target steering angle calculating means 202 to the steering angle control means 203 when the vehicle speed V is less than a predetermined value V1, and applies the output from the second target steering angle calculating means 303 to the steering angle control means 203 when the vehicle speed V is not less than the predetermined value V1.

The steering angle control means 203 energizes the drive motor 4 in accordance with the actual steering angle detected by the drive motor 4 and the target steering angle calculated and selected as stated above, and executes control (e.g., proportional integral control) for setting the steering angle of the vehicle so that the actual steering angle next detected becomes the current target steering angle.

Thus, when the vehicle speed is low (less than the predetermined value V1), the amount of turn of the vehicle can be accurately controlled without resorting to the actual amount of turn of the vehicle that is poor in accuracy, by controlling the steering angle of the steering system 5 (i.e., the angle of rotation of the drive motor 4) in accordance with the output of the first control means 200; namely, by executing control so that the angle of rotation of the drive motor 4 agrees with the curvature of the guide way 7 (the target amount of turn) captured by the camera 8. Also, when the vehicle speed is so high as to provide the actual amount of turn with high accuracy, the amount of turn of the vehicle can be accurately controlled by controlling the drive motor 4 in accordance with the output of the second control means 300 based on the actual amount of turn so that the actual amount of turn agrees with the target amount of turn.

Embodiment 2.

In a second embodiment (hereinafter referred to as Embodiment 2), the switching means 204 in the above Embodiment 1 is modified so as to have a hysteresis. In practice, this modified switching means 204 having a hysteresis sets two thresholds for the vehicle speed in the process of switching over the control mode. A first threshold Vth1 for which the vehicle speed V was determined to be less than the threshold in the previous cycle of detection, and a second threshold Vth2 for which the vehicle speed V was determined to be not less than the threshold in the previous cycle of detection, are set to meet the relationship of Vth1>Vth2.

Specifically, the modified switching means 204 switches over the output when the vehicle speed V exceeds the first threshold Vth1, but does not switch over the output until the vehicle speed V lowers below the second threshold Vth2 after that. Also, the modified switching means 204 switches over the output when the vehicle speed V lowers below the second threshold Vth2, but does not switch over the output until the vehicle speed V exceeds the first threshold Vth1 after that. As a result, the control mode is prevented from being switched over so frequently.

Embodiment 3.

Figure 3:
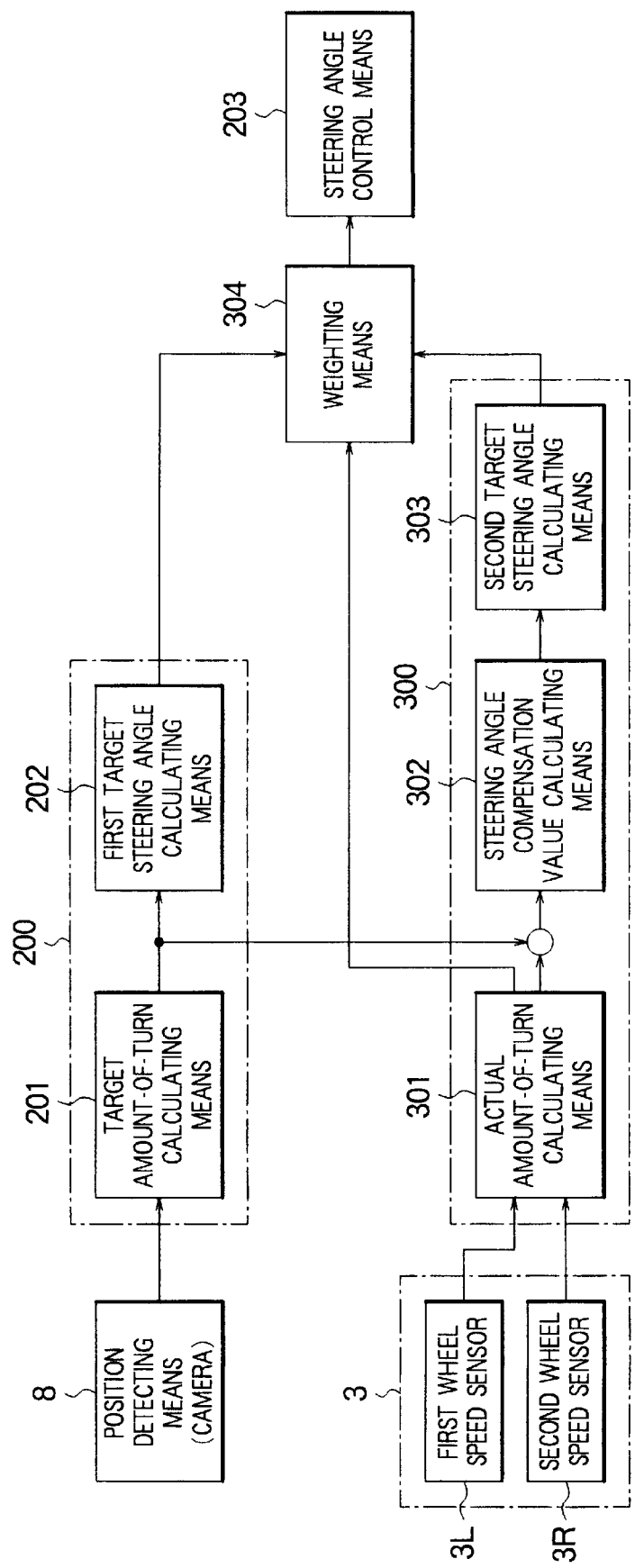
FIG. 3 is a functional block diagram showing functions of the controller in Embodiment 3 of the present invention.
Figure 4:
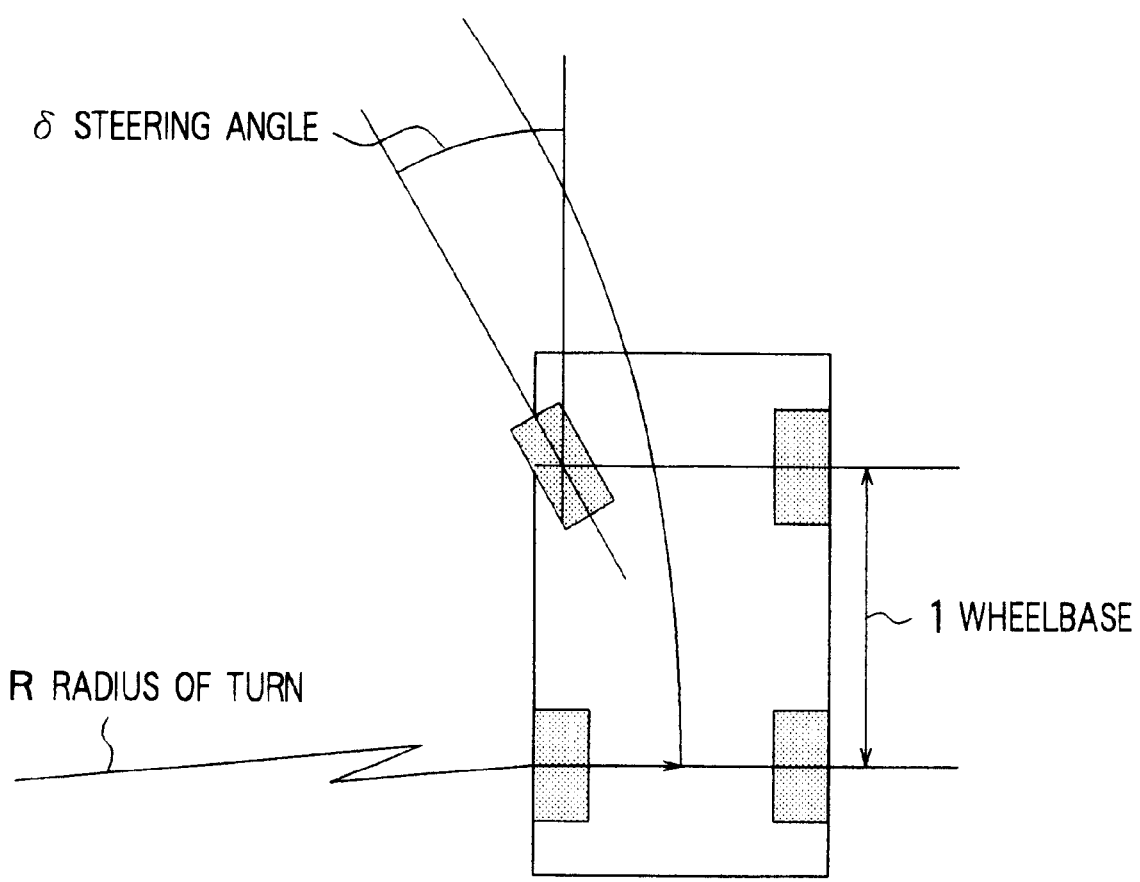
FIG. 4 is an illustration for explaining operation of the automatic traveling control system for a vehicle according to the present invention.

FIG. 3 shows an automatic traveling control system for a vehicle according to a third embodiment (hereinafter referred to as Embodiment 3) of the present invention. In this Embodiment 3, the switching means 204 in the above Embodiment 1 is replaced by a weighting means 304 with the other construction remaining the same.

In FIG. 3, first, the first control means 200 takes the image signal Dg indicative of an area including the guide way 7 from the camera 8 into the target amount-of-turn calculating means 201 which calculates a curvature of the guide way 7, as a target amount (curvature) Kt of turn, through image processing of image data of the image signal Dg.

Based on the target amount (curvature) Kt of turn obtained by the target amount-of-turn calculating means 201, the first target steering angle calculating means 202 then calculates a target steering angle $\delta_{t1}$, at which the target amount (curvature) Kt of turn is achieved.

The second control means 300 determines a target steering angle $\delta_{t2}$ in the same manner as in Embodiment 1.

Thereafter, based on the vehicle speed V determined by the actual amount-of-turn calculating means 301, the weighting means 304 determines a weighting factor W(V) from the following formula;

$$W(V) = R \cdot V \quad [V < (1/R)] \quad (6)$$

$$W(V) = 1 \quad [V > (1/R)]$$

(where R: proportional constant).

While the weighting factor W(V) is calculated by using only the vehicle speed V in the above formula (6) shown by way of example, the parameter is not limited to the vehicle speed alone, and any other variable, e.g., the speed difference between the left and right wheels, may be used in combination with the vehicle speed. Also, while the above formula (6) employs a function of the first degree, the function for calculating the weighting factor W(V) is not limited to a linear (first-order) function, but may be a quadric (second-order) or higher-order function.

Based on the weighting factor W(V), the target steering angle $\delta_{t1}$ determined by the first control means 200 and the target steering angle $\delta_{t2}$ determined by the second control means 300, the weighting means 304 then calculates a target steering angle $\delta_t$ from the following formula;

$$\delta_t 32 \ W(V) \cdot \delta_{t2} + (1 - W(V)) \cdot \delta_{t1} \quad (7)$$

(where W(V): weighting factor).

The steering angle control means 203 energizes the drive motor 4 in accordance with the actual steering angle detected by the drive motor 4 and the target steering angle $\delta_t$, and executes control (e.g., proportional integral control) for setting the actual steering angle so as to become equal to the target steering angle $\delta_t$.

Thus, with this Embodiment 3, the steering angle is controlled by using only the output of the second control means 300 when the vehicle speed V is V>(1/R), using only the output of the first control means 200 when the vehicle speed V is zero, and using the sum of the products obtained by multiplying both the outputs by respective weights when the vehicle speed V is between zero and (1/R). As a result, the control mode can be prevented from being switched over so frequently between the first control means 200 and the second control means 300, and hence a deterioration in controllability can be avoided, which would otherwise be caused upon frequent switching-over of the control mode.

With the automatic traveling control system for the vehicle according to the present invention, as described above, when the vehicle speed is not less than the threshold below which a predetermined amount of turn can be achieved more accurately by controlling the steering angle determined from the target amount of turn than in the case of controlling the steering angle so that the detected actual amount of turn agrees with the target amount of turn, the control mode is switched over to select the second control means for controlling the steering angle so that the detected actual amount of turn agrees with the target amount of turn, and when the vehicle speed is less than the threshold, the control mode is switched over to select the first control means for controlling the steering angle determined from the target amount of turn. Therefore, the disadvantage of the second control means for controlling the steering angle so that the detected actual amount of turn agrees with the target amount of turn, i.e., poor controllability at a low vehicle speed, and the disadvantage of the first control means for controlling the steering angle determined from the target amount of turn, i.e., poor controllability at a high vehicle speed, are canceled and the controllability can be improved as a whole.

Also, by providing the weighting means for weighting the outputs of the first and second control means depending on the vehicle speed and supplying the weighted outputs to the steering angle control means for control of the steering angle, or by designing the switching means to have a hysteresis, the control mode can be prevented from being switched over so frequently. As a result, a deterioration in controllability can be avoided which would otherwise be caused upon frequent switching-over of the control mode.

What is claimed is:

1. An automatic traveling control system for a vehicle comprising:

first control means for determining a target amount of turn of the vehicle and calculating a first target steering angle corresponding to said target amount of turn of the vehicle, second control means for determining an actual amount of turn of the vehicle and determining a second target steering angle based on the actual amount of turn and the target amount of turn of the vehicle, steering angle control means for controlling a steering angle of the vehicle in accordance with an output of one of said first control means and said second control means, speed detecting means for detecting a speed of the vehicle, and switching means for selectively switching over the outputs of said first control means and said second control means depending on the vehicle speed detected by said speed detecting means, and supplying the selected output to said steering angle control means to thereby control the steering angle.

2. An automatic traveling control system for a vehicle according to claim 1, further comprising position detecting means for detecting a curvature of a traveling road of the vehicle, wherein said first control means comprises:
        target amount-of-turn calculating means for calculating said target amount of turn from the curvature of the traveling road detected by said position detecting means, and
        first target steering angle calculating means for calculating said first target steering angle corresponding to the target amount of turn.

3. An automatic traveling control system for a vehicle according to claim 2, wherein said second control means comprises:

actual amount-of-turn calculating means for determining said actual amount of turn of the vehicle from an output of said speed detecting means, steering angle compensation value calculating means for calculating a steering angle compensation value based on the actual amount of turn determined by said actual amount-of-turn calculating means and the target amount of turn determined by said target amount-of-turn calculating means, and second target steering angle calculating means for calculating said second target steering angle in consideration of the steering angle compensation value calculated by said steering angle compensation value calculating means.

4. An automatic traveling control system for a vehicle according to claim 3, wherein said speed detecting means comprises:

a first wheel speed sensor for detecting, as a first wheel speed, a speed of one wheel on one side of the vehicle, and a second wheel speed sensor for detecting, as a second wheel speed, a speed of one wheel on the other side of the vehicle, and wherein said actual amount-of-turn calculating means calculates the actual amount of turn of the vehicle from the first and second wheel speeds detected by said first and second wheel speed sensors.

5. An automatic traveling control system for a vehicle according to claim 1, wherein said switching means has a hysteresis in determination for switching over said first and second control means.

6. An automatic traveling control system for a vehicle comprising:

first control means for determining a target amount of turn of the vehicle and calculating a first target steering angle corresponding to said target amount of turn of the vehicle, second control means for determining an actual amount of turn of the vehicle and determining a second target steering angle based on the actual amount of turn and the target amount of turn of the vehicle, steering angle control means connected to said first and second control means for controlling a steering angle of the vehicle in accordance with outputs of said first control means and said second control means, speed detecting means for detecting a speed of the vehicle, and weighting means for applying different weights to the outputs of said first control means and said second control means depending on the vehicle speed detected by said speed detecting means, and supplying the weighted outputs to said steering angle control means to thereby control the steering angle.

7. An automatic traveling control system for a vehicle according to claim 6, further comprising position detecting means for detecting a curvature of a traveling road of the vehicle, wherein said first control means comprises:

target amount-of-turn calculating means for calculating said target amount of turn from the curvature of the traveling road detected by said position detecting means, and first target steering angle calculating means for calculating said first target steering angle corresponding to the target amount of turn.

8. An automatic traveling control system for a vehicle according to claim 7, wherein said second control means comprises:

actual amount-of-turn calculating means for determining said actual amount of turn of the vehicle from an output of said speed detecting means, steering angle compensation value calculating means for calculating a steering angle compensation value based on the actual amount of turn determined by said actual amount-of-turn calculating means and the target amount of turn determined by said target amount-of-turn calculating means, and second target steering angle calculating means for calculating said second target steering angle in consideration of the steering angle compensation value calculated by said steering angle compensation value calculating means.

9. An automatic traveling control system for a vehicle according to claim 8, wherein said speed detecting means comprises:

a first wheel speed sensor for detecting, as a first wheel speed, a speed of one wheel on one side of the vehicle, and a second wheel speed sensor for detecting, as a second wheel speed, a speed of one wheel on the other side of the vehicle, and wherein said actual amount-of-turn calculating means calculates the actual amount of turn of the vehicle from the first and second wheel speeds detected by said first and second wheel speed sensors.

* * * * *